United States Patent
Shin et al.

(10) Patent No.: US 11,702,060 B2
(45) Date of Patent: Jul. 18, 2023

(54) POWER RELAY ASSEMBLY AND VEHICLE COMPRISING THE SAME AND CONTROL METHOD OF POWER RELAY ASSEMBLY

(71) Applicants: Hyundai Motor Company, Seoul (KR); Kia Motors Corporation, Seoul (KR); Yura Corporation Co., Ltd., Gyeonggi-do (KR)

(72) Inventors: Sangho Shin, Gyeonggi-do (KR); Haesung Nam, Seoul (KR); Bum-Kyo Jung, Gyeonggi-do (KR); Dae-Hwan Kwon, Gyeonggi-do (KR)

(73) Assignees: Hyundai Motor Company, Seoul (KR); Kia Motors Corporation, Seoul (KR); Yura Corporation Co., Ltd., Gyeonggi-do (KR)

(*) Notice: Subject to any disclaimer, the term of this patent is extended or adjusted under 35 U.S.C. 154(b) by 323 days.

(21) Appl. No.: 17/063,223

(22) Filed: Oct. 5, 2020

(65) Prior Publication Data
US 2021/0276532 A1      Sep. 9, 2021

(30) Foreign Application Priority Data
Mar. 4, 2020   (KR) ........................ 10-2020-0027327

(51) Int. Cl.
| | |
|---|---|
| *H01M 10/42* | (2006.01) |
| *B60W 20/13* | (2016.01) |
| *B60L 58/14* | (2019.01) |
| *B60L 50/60* | (2019.01) |
| *B60L 3/00* | (2019.01) |

(52) U.S. Cl.
CPC ............ *B60W 20/13* (2016.01); *B60L 3/0046* (2013.01); *B60L 50/60* (2019.02); *B60L 58/14* (2019.02); *H01M 10/425* (2013.01); *B60L 2210/10* (2013.01); *H01M 2010/4278* (2013.01)

(58) Field of Classification Search
CPC ...... B60L 58/10; B60L 53/20; H01M 10/425; H01M 2010/4278
USPC ......................................................... 320/104
See application file for complete search history.

(56) References Cited

U.S. PATENT DOCUMENTS

| | | | |
|---|---|---|---|
| 8,228,037 B2* | 7/2012 | Furukawa ........... | H02J 7/00304 320/134 |
| 10,411,501 B2* | 9/2019 | Akita ..................... | H01H 9/542 |

(Continued)

FOREIGN PATENT DOCUMENTS

WO    WO 2019/132373    *    7/2019

OTHER PUBLICATIONS

English Machine Translation of WO 2019/132373, 21 pages (Year: 2019).*

*Primary Examiner* — Nathaniel R Pelton
(74) *Attorney, Agent, or Firm* — Fox Rothschild LLP (57) ABSTRACT

A power relay assembly is provided and includes a first relay that is connected to a positive end of a battery and a second relay that is connected to a negative end of the battery and connected to the first relay via a DC capacitor. A first Field Effect Transistor (FET) is connected in parallel with the first relay and a second FET is connected in parallel with the first relay and connected in series with the first FET. A voltage control circuit is configured to adjust a voltage of the first FET with a first voltage or adjust a voltage of the first FET with a second voltage lower than the magnitude of the first voltage.

18 Claims, 12 Drawing Sheets

(56) References Cited

U.S. PATENT DOCUMENTS

2019/0097438 A1* 3/2019 Song .................. B60L 3/12
2020/0307411 A1* 10/2020 Moriya ............... B60L 53/10

* cited by examiner

FIG. 1

PRIOR ART

FIG. 2

PRIOR ART

POWER RELAY ASSEMBLY AND VEHICLE COMPRISING THE SAME AND CONTROL METHOD OF POWER RELAY ASSEMBLY

CROSS-REFERENCE TO RELATED APPLICATION

This application is based on and claims priority under 35 U.S.C. § 119 to Korean Patent Application No. 10-2020-0027327, filed on Mar. 4, 2020, the disclosure of which is incorporated herein by reference.

BACKGROUND

1. Technical Field

The disclosure relates to a power relay assembly that controls the power of a high-power large-capacity battery included in an electric vehicle.

2. Description of the Related Art

The vehicle may be divided into an internal combustion engine vehicle, a hybrid electric vehicle, and a pure electric vehicle according to the type of power source generating the driving force. An internal combustion engine vehicle is a vehicle that generates power by burning fossil fuels, and is the most commonly used vehicle. Hybrid electric vehicles and pure electric vehicles have been developed and the penetration rate is gradually increasing to solve the exhaustion problem of fossil fuel used as a fuel for an internal combustion engine vehicle and an environmental pollution problem.

A hybrid electric vehicle (HEV) may be divided into two different types as follows. The first form of the hybrid electric vehicle is equipped with both a motor and an internal combustion engine, and charges the battery using the driving force of the internal combustion engine or regenerative energy generated during braking to drive the motor. In the second form of the hybrid electric vehicle, it is the same as the first form having both a motor and an internal combustion engine, but a method of charging a battery by supplying electric power from the outside is added. In other words, the second form of the hybrid electric vehicle may be charged with a battery by receiving power from the outside through a plug-in method. This is the aforementioned plug-in hybrid electric vehicle (PHEV).

Pure electric vehicles (EV) are also being developed and distributed in multiple forms. A hydrogen electric vehicle is a type that drives a motor by charging a battery with electricity generated during a chemical reaction between hydrogen and oxygen. These hybrid electric vehicles and electric vehicles use high-power large-capacity batteries to supply a substantial amount of power to a motor used as a power source. In particular, the power relay assembly is configured to supply or cut off the high voltage and high current power of the battery to the motor. In addition, the power relay assembly performs the initial charging through the pre-charge to prevent damage to the inverter due to the high voltage inrush current before the relay is driven.

Meanwhile, a conventional power relay assembly used for a hybrid electric vehicle and an electric vehicle uses a method including a gas charging relay and a method including a semiconductor switching element. The prior art including gas charging relay has the disadvantage of being large and heavy. The prior art using a semiconductor switching element has a problem in that when the battery is charged, the semiconductor switching element may be damaged in an operation of cutting off power, or power may not be blocked by a diode provided inside the semiconductor element.

SUMMARY

Therefore, an aspect of the disclosure provides a power relay assembly capable of reducing weight and size compared to a conventional gas charging relay, a vehicle comprising the same and a control method of a power relay assembly by providing at least two semiconductor switching elements without pre-charge resistor and provide a power relay assembly to improve the life and durability compared to the prior art, a vehicle comprising the same and a control method of a power relay assembly by removing the spark generated in the relay on/off.

In accordance with one aspect of the disclosure, a power relay assembly may include: a first relay connected to a positive end of a battery; a second relay connected to a negative end of the battery and connected to the first relay via a direct current (DC) capacitor; a first Field Effect Transistor (FET) connected in parallel with the first relay; a second FET connected in parallel with the first relay and connected in series with the first FET; and a voltage control circuit configured to adjust a voltage of the first FET with a first voltage or adjust a voltage of the first FET with a second voltage lower than the magnitude of the first voltage.

The voltage control circuit may include a DC/DC converter and at least two semiconductor elements and may be configured to control the first FET based on the second voltage to charge the DC capacitor. The power relay assembly may further include: a transceiver configured to communicate with a battery management system (BMS) that controls the battery; and a controller configured to operate the voltage control circuit based on an on signal or off signal of the BMS.

The controller may be configured to collect the output voltage of the DC/DC converter, and determine whether the DC/DC converter is normal based on the collected voltage. The controller may be configured to turn on the second relay based on the on signal of the BMS, operate the power control circuit to apply the second voltage to the first FET and turn off the first FET after turning on the first relay. Additionally, the controller may be configured to control the power control circuit to apply the first voltage to the first FET and the second FET based on the off signal of the BMS, turn off the first FET and the second FET after turning off the first relay and turn off the second relay.

The power relay assembly may further include: a current sensor disposed between the battery and the first relay, and the controller may be configured to determine whether normal operation is performed based on the detection value of the current sensor, and transmit the determination result to the BMS via the transceiver. The magnitude of the second voltage may be determined based on element characteristics of the first FET and the second FET or charging time of the DC capacitor.

The controller may be configured to determine whether the transceiver is normal, receive a Pulse Width Modulation (PWM) signal from the BMS when the failure of the transceiver occurs as a result of the determination and control the voltage control circuit based on the received PWM signal. The controller may be configured to turn on or turn off the power relay assembly based on the PWM signal, diagnose a failure of the power relay assembly and turn off the PWM signal based on the diagnosis result.

In accordance with one aspect of the disclosure, a vehicle may include: a motor; a battery configured to drive the motor; and a power relay assembly configured to connect the battery and the motor, and the power relay assembly may include: a first relay connected to a positive end of a battery; a second relay connected to a negative end of the battery and connected to the first relay through a DC capacitor; a first Field Effect Transistor (FET) connected in parallel with the first relay; a second FET connected in parallel with the first relay and connected in series with the first FET; and a voltage control circuit configured to adjust a voltage of the first FET with a first voltage or adjust a voltage of the first FET with a second voltage lower than the magnitude of the first voltage.

The voltage control circuit may include a DC/DC converter and at least two semiconductor elements and may be configured to control the first FET based on the second voltage to charge the DC capacitor. The vehicle may further include: a battery management system (BMS) configured to operate the battery, and the power relay assembly may include: a transceiver configured to communicate with the BMS; and a controller configured to operate the voltage control circuit based on an on signal or off signal of the BMS.

The controller may be configured to collect the output voltage of the DC/DC converter, and determine whether the DC/DC converter is normal based on the collected voltage. The controller may be configured to turn on the second relay based on the on signal of the BMS, control the power control circuit to apply the second voltage to the first FET and turn off the first FET after turning on the first relay. Additionally, the controller may be configured to control the power control circuit to apply the first voltage to the first FET and the second FET based on the off signal of the BMS, turn off the first FET and the second FET after turning off the first relay and turn off the second relay.

The vehicle may further include: a current sensor disposed between the battery and the first relay, and the controller may be configured to determine whether normal operation is performed based on the detection value of the current sensor, and transmit the determination result to the BMS via the transceiver. The magnitude of the second voltage may be determined based on element characteristics of the first FET and the second FET or charging time of the DC capacitor. The controller may be configured to determine whether the transceiver is normal, receive a Pulse Width Modulation (PWM) signal from the BMS when the failure of the transceiver occurs as a result of the determination and adjust the voltage control circuit based on the received PWM signal.

In accordance with one aspect of the disclosure, a control method of a power relay assembly including a first relay connected to a positive end of a battery, a second relay connected to a negative end of the battery and connected to the first relay through a DC capacitor, a first Field Effect Transistor (FET) connected in parallel with the first relay and a second FET connected in parallel with the first relay and connected in series with the first FET, the control method may include: receiving a control signal from the BMS configured to control the battery; and adjusting the voltage of the first FET with a first voltage based on the control signal of the BMS or adjusting the voltage of the first FET with a second voltage lower than the magnitude of the first voltage.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Like reference numerals refer to like elements throughout the specification. Not all elements of exemplary embodiments of the disclosure will be described, and description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network. Also, when a part "includes" or "comprises" an element, unless there is a particular description contrary thereto, the part may further include other elements, not excluding the other elements.

In the specification, it will be understood that, when a member is referred to as being "on/under" another member, it can be directly on/under the other member, or one or more intervening members may also be present. It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise. An identification code is used for the convenience of the description but is not intended to illustrate the order of each step. Each of the steps may be implemented in an order different from the illustrated order unless the context clearly indicates otherwise.

Figure 1:
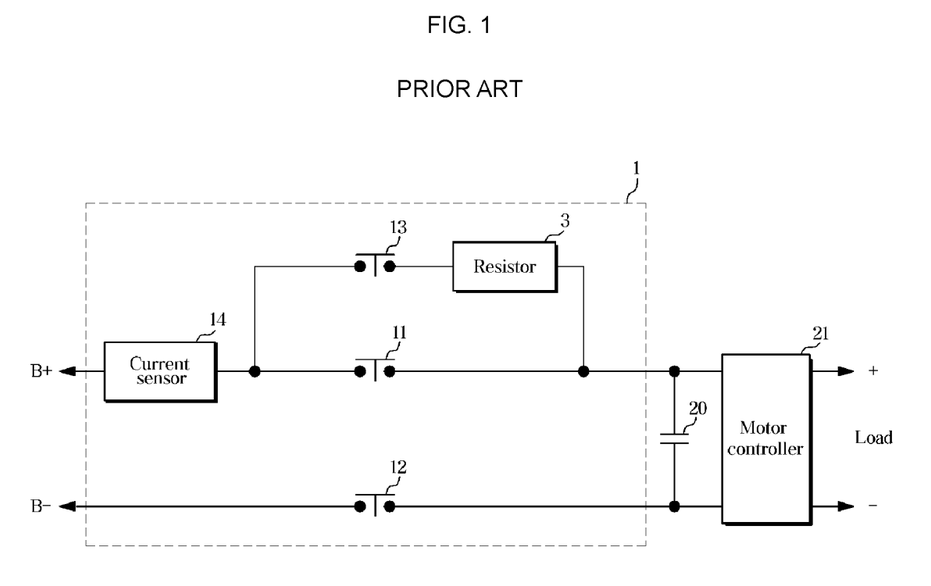
FIGS. 1 and 2 are circuit diagrams and control block diagrams of a power relay assembly disclosed in the prior art.
Figure 2:
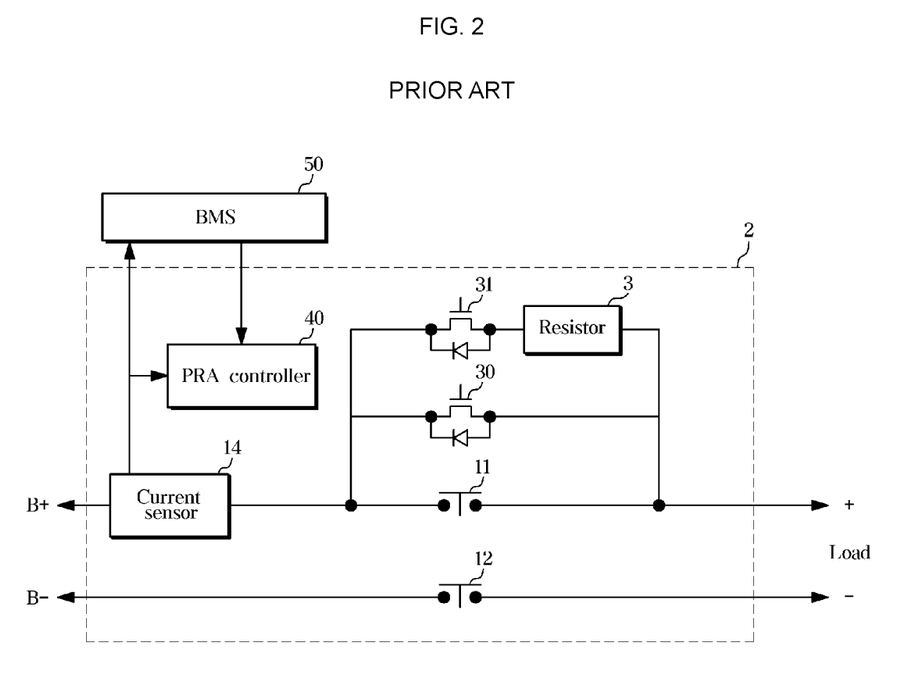

Hereinafter, the operation principles and embodiments of the disclosure will be described with reference to the accompanying drawings. FIGS. 1 and 2 are circuit diagrams and control block diagrams of a power relay assembly disclosed in the prior art. In order to avoid overlapping descriptions, the following description will be given.

Referring first to FIG. 1, the prior art may be a mechanical power relay assembly (hereinafter, prior art (1)). The prior art (1) may include a first relay 11 corresponding to the main (+) relay, a second relay 12 corresponding to the main (−) relay, a third relay 13 for pre-charge and a pro-charge resistor 3 to suppress sparking and bus-bar capable of delivering high power. In addition, the prior art (1) may include a current sensor 14 for measuring the current that is charged or discharged through the high voltage battery (B+, B−), it may be provided with a cement resistor.

For example, when the prior art (1) is applied to a hybrid vehicle or the like, the prior art (1) is connected to the DC capacitor 20 for pre-charging, and the DC capacitor 20 may be connected to the motor controller 21 and other loads. When the motor is operated according to starting, the prior art (1) performs pre-charging before the first relay 11 is turned on to prevent the occurrence of high inrush current, and limits the high inrush current with the pre-charge resistor 3.

The prior art (1) uses a gas charging relay, i.e., a third relay 13, in which a special gas is charged to suppress sparks that may occur in on or off operations of the first relay 11 and the second relay 12. These gas charging relays have the disadvantage of being large and heavy. In addition, a magnet must be included in the third relay 13 to control the spread of the spark, and an additional device is required for the stability of the mechanical structure. This additional device may affect the sensing operation of the current sensor 14, and there is a problem in that a design constraint that the current sensor 14 and the third relay 13 must maintain a certain distance occurs. To solve the problems of the prior art (1), the prior art (2) used a semiconductor switching element instead of the third relay (13).

Referring to FIG. 2, the prior art 2 includes a first semiconductor element 30 and a second semiconductor element 31 in addition to the first relay 11 and second relay 12. The first semiconductor element 30 and the second semiconductor element 31 are connected in parallel, and the pre-charge resistor 3 is connected in series with the second semiconductor element 31. The first semiconductor element 30 and the second semiconductor element 31 may be field effect transistors including internal diodes. A PRA controller 40 is provided to operate the first semiconductor element 30 and the second semiconductor element 31. The PRA controller 40 receives a signal related to charging or discharging of the battery from a battery management system (BMS) 50 that controls the battery B. The PRA controller 40 is configured to turn the first relay 11 and the second relay 12 on or off, or operate the first semiconductor element 30 and the second semiconductor element 31 for pre-charging.

To suppress sparks or arcs that may occur in the on or off operation of the first relay 11 and the second relay 12, the PRA controller 40 makes both contacts of the relays 11 and 12 the same potential through the first semiconductor element 30 and the second semiconductor element 31, and operates the first relay 11 and the second relay 12. On the other hand, the prior art (2) also included a pre-charge resistor 3, such as cement resistor, or PTC (Positive Temperature Coefficient of resistance) resistor, as in the prior art (1) for pre-charging.

To solve the problems occurring in the prior art (1), the prior art (2) used timing control of the semiconductor elements (30, 31) to eliminate sparks or arcs occurring in relay on or off. However, in a failure situation in which the semiconductor element is not operated, when the BMS 50 is unable to diagnose the state of the power relay assembly, an additional wire harness and additional circuit for diagnosis are required, if necessary. In addition, even if an additional wire harness is installed in preparation for a fail situation, there is a problem of losing control of the power relay assembly when disconnection or short circuit occurs in the harness. The electric vehicle (EV) using a high voltage may be emergency shut off while supplying power from the battery B to the load. However, in this emergency shut-off, the prior art (2) has a problem that it is impossible to completely cut off the power by the diodes inside the semiconductor elements 30, 31.

Figure 3:
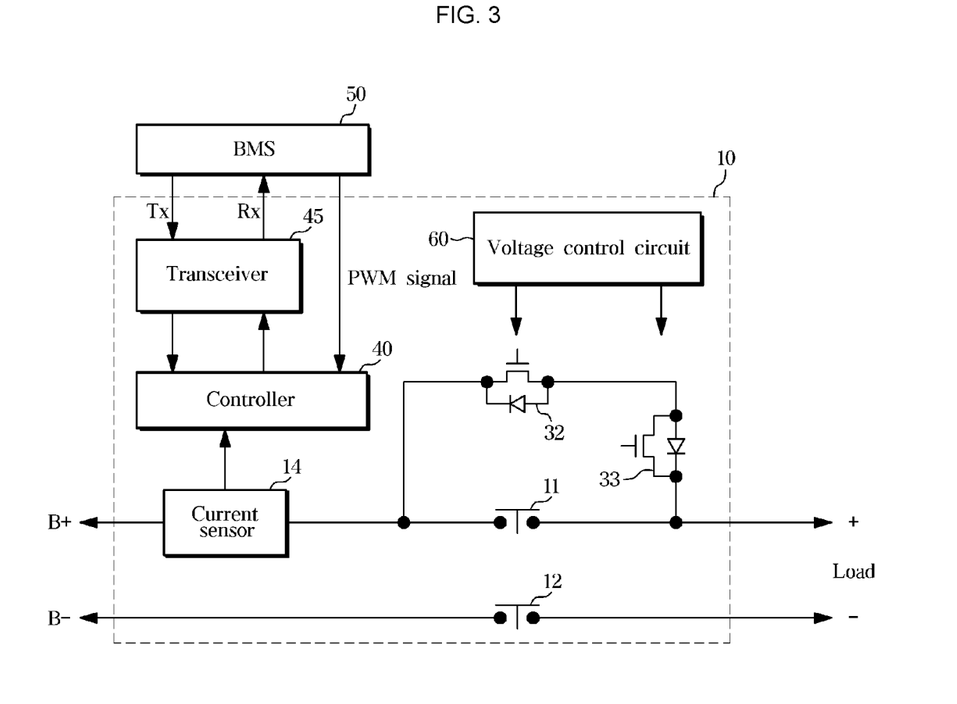
FIG. 3 is a structural diagram of a power relay assembly according to an exemplary embodiment.

FIG. 3 is a structural diagram of a power relay assembly according to an exemplary embodiment.

The disclosed power relay assembly 10 may include a first relay 11 connected to the positive end (B+) of the battery, a second relay 12 connected to the negative end (B−) of the battery, a First switch connected in parallel with the first relay, A second switch connected in series with the first switch and a voltage to apply the first switch and Voltage control circuit (60) operating the second switch. The first switch and the second switch may be implemented as a FET (field effect transistor) or an IGBT (insulated gate bipolar transistor). Hereinafter, for convenience of explanation, a description is made based on a FET, but the power assembly 10 may be implemented with an IGBT instead of a FET.

Referring to FIG. 3, the disclosed power relay assembly 10 may include a first relay 11 connected to the positive end (B+) of the battery, a second relay 12 connected to the negative end (B−) of the battery, a First FET (Field Effect Transistor, 32) connected in parallel with the first relay, A second FET 33 connected in series with the first FET 32 and a voltage to apply the first FET 32 and Voltage control circuit (60) operating the second FET (33)

In particular, the disclosed power relay assembly 10 compensates for the disadvantages of the mechanical relay compared to the prior art (1) by eliminating the pre-charge resistor 3 and connecting the 1 FET 32 and the second FET 33 in series. Additionally, compared to the prior art (2), the disclosed power relay assembly 10 is possible to completely cut off the power in preparation for an emergency cut-off during power supply from the battery B to the load.

The disclosed power relay assembly 10 may include a BMS 50 and a transceiver 45 configured to transmit (Tx) or receive (Rx) a signal. The transceiver 45 may be configured to receive a signal related to charging or discharging of a battery transmitted from the BMS 50, and based on the received signal, the controller 40 may be configured to operate first relay 11, second relay 12, voltage control circuit 60. The transceiver 45 may be configured to communicate with the BMS 50 via various networks such as vehicle communication provided with the disclosed power relay assembly 10, for example, Controller Area Network (CAN) communication, Local Interconnect Network (LIN) communication or Ethernet communication.

Meanwhile, in preparation for a communication failure with the BMS 50, the controller 40 may be configured to receive a PWM signal directly from the BMS 50. The controller 40 may be configured to turn the first relay 11 and second relay 12 on or off according to the PWM duty or period. The disclosed power relay assembly 10 may be provided in the form of a micro control unit (MCU) including a controller 40 and a transceiver 45, so that a fail safe operation in preparation for a fail situation mentioned in the prior art (2) is possible. The controller 40 may be configured to receive the current detection value through the current sensor 14. The controller 40 may be configured to determine whether normal operation is performed based on the received current detection value, and transmit the current detection value to the BMS 50 through the transceiver 45.

The pre-charging operating in the disclosed power relay assembly 10 may be performed by the first FET 32 and the second FET 33. Specifically, the voltage control circuit 60 may include a DC/DC converter 61 and may be configured to apply a first voltage (hereinafter, turn-on voltage) to turn on the first FET 32 or a second voltage (hereinafter, pre-charge voltage) having a magnitude lower than the turn-on voltage. In other words, the disclosed power relay assembly 10 may be configured to perform pre-charging such that current is limited by applying a low-sized pre-charge voltage. Through this, the disclosed power relay assembly 10 may eliminate the pre-charge resistor 3 provided in the prior art (2). The second FET 33 may be used to maintain the potential of the positive end of the first relay 11 the same when the emergency blocking of the relay is required during charging of the high voltage battery B. The second FET 33 may also operate through the controller 40 and voltage control circuit 60.

Figure 4:
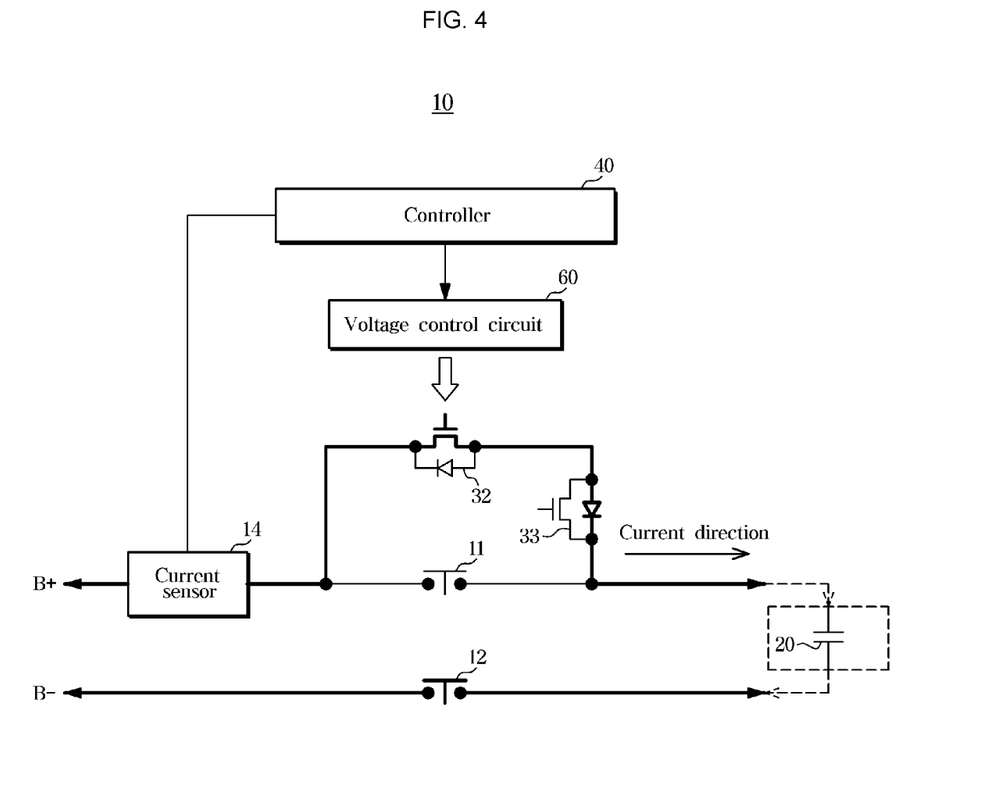
FIG. 4 is a view for describing the pre-charge operation of the power relay assembly according to an exemplary embodiment.

FIG. 4 is a view for describing the pre-charge operation of the power relay assembly according to an exemplary embodiment. Referring to FIG. 4, the controller 40 may be configured to turn on the second relay 12 for charging the DC capacitor 20. In addition, the controller 40 may be configured to apply a pre-charge voltage to the gate-source of the first FET 32. The controller 40 does not apply voltage to the second FET 33.

Since the pre-charge voltage is a voltage having a magnitude lower than the turn-on voltage that the voltage control circuit 60 may apply, the current flowing from the battery B to the capacitor by the first FET 32 is limited. The current limited through the first FET 32 charges the DC capacitor 20 through the internal diode of the second FET 33. When charging is completed, both contacts of the first relay 11 become the same potential, and no spark or arc occurs even when the first relay 11 is turned on. In other words, the disclosed power relay assembly 10 may eliminate the pre-charge resistor 3 included in the prior art (1) and the prior art (2), thereby reducing size and reducing weight.

Figure 5:
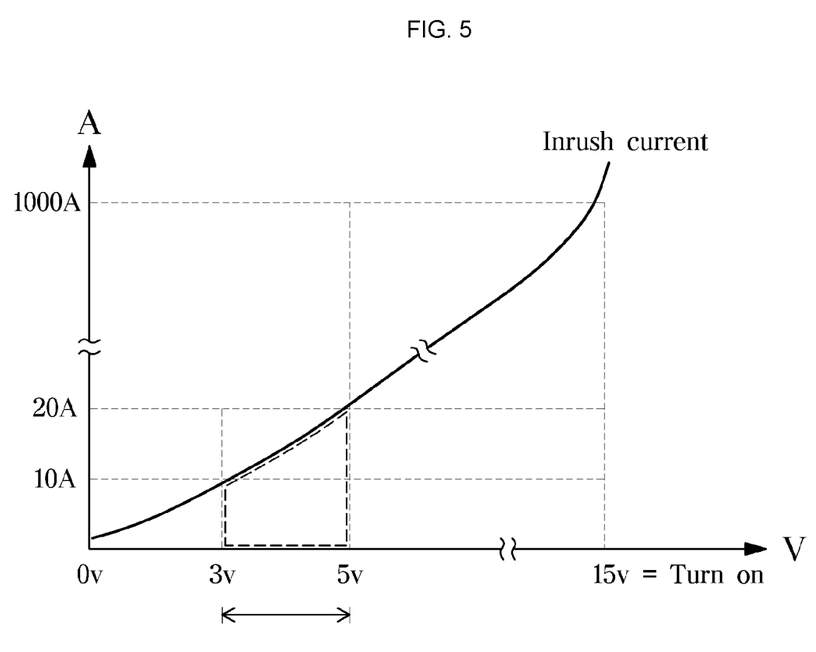
FIG. 5 is a graph of an embodiment of determining the magnitude of a pre-charge voltage according to an exemplary embodiment.

FIG. 5 is a graph of an exemplary embodiment of determining the magnitude of a pre-charge voltage. In the graph of FIG. 5, the X-axis is a magnitude (unit V) of a voltage that can be applied to the first FET 32. The Y axis is the magnitude (unit A) of the inrush current flowing from the high power battery B to the power relay assembly 10 according to the applied voltage.

As shown in FIG. 5, when the first FET 32 is set to a turn-on voltage (15V) to turn on, a very high inrush current of up to 1000 A may occur. When such high magnitude inrush current occurs in the repeated on or off operation of the first relay 11 and the second relay 12, the stress that the processor or other elements in the controller 40 receive may cause durability problems. Therefore, the disclosed power relay assembly 10 controls the first FET 32 through a pre-charge voltage (e.g., 3V to 5V) having a size lower than the turn-on voltage.

Meanwhile, the magnitude of the pre-charge voltage may vary. The magnitude of the pre-charge voltage should be suitable for protecting components and elements from inrush current, and should charge the DC capacitor 20 within a suitable time. Therefore, the magnitude of the pre-charge voltage may be changed according to the characteristics of the components and elements provided in the power relay assembly 10 and the capacity of the DC capacitor 20.

When the pre-charge voltage is set within about 0V to 3V, the magnitude of the inrush current is decreased, but the charging time of the DC capacitor 20 may be delayed. When the pre-charge voltage is set within about 5V to 15V, the size of the inrush current may be gradually increased, and damage of components and elements provided in the power relay assembly 10 may be accumulated, and damage may be transmitted to a load. Therefore, the disclosed power relay assembly 10 may set the pre-charge voltage to within about 3 to 5 V, and apply a pre-charge voltage to the first FET 32 during the pre-charge operation.

Figure 6A:
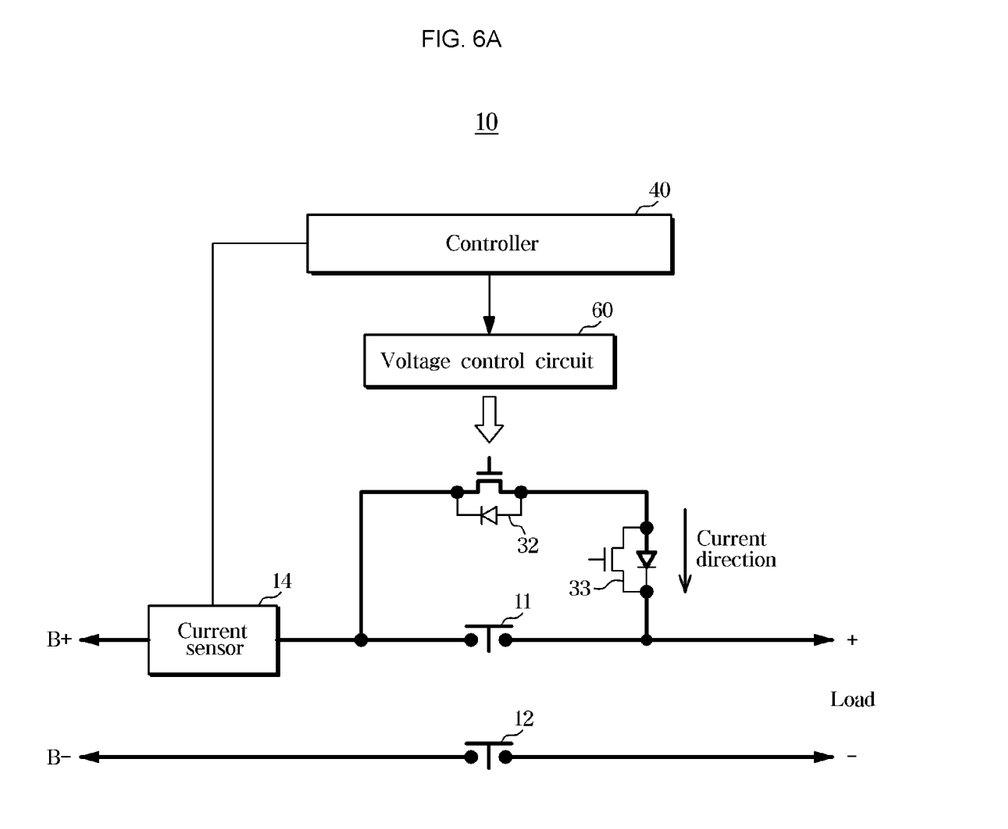
FIGS. 6A and 6B are views for describing the operation of the power relay assembly operating in the discharge state of the battery according to an exemplary embodiment.
Figure 6B:
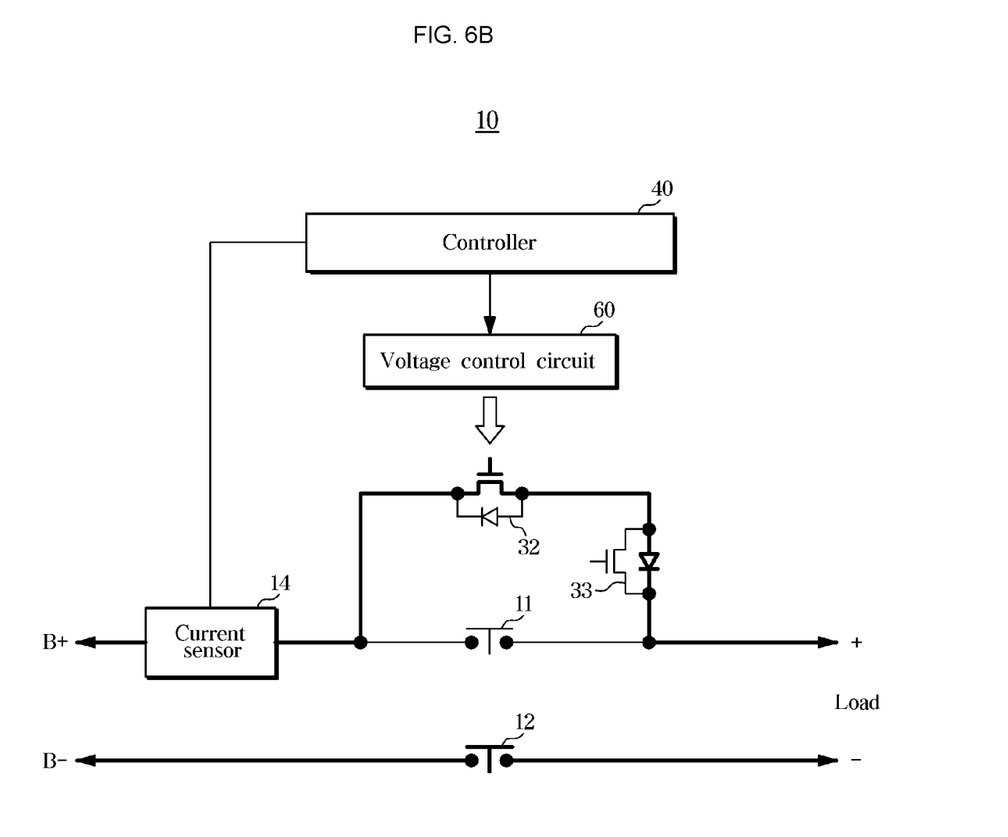

FIGS. 6A and 6B are views for describing the operation of the power relay assembly operating in the discharge state of the battery. As described above with reference to FIG. 4, when the DC capacitor 20 is charged due to the pre-charge operation, spark or arc does not occur even when the first relay 11 is turned off. After the pre-charge, the battery (B) may be configured to supply the charged power to the load. In other words, when the battery (B) is being discharged, the controller 40 may be configured to apply a turn-on voltage (e.g., 15V) to the first FET 32 and turn on the first FET 32. As shown in FIG. 6A, the current flows to the load through the internal diodes of the first FET 32 and the second FET 33 through the battery B. Both contacts of the first relay 11 have the same potential due to the free charge. In other words, even if the first relay 11 is turned off as shown in FIG. 6B, arc or spark does not occur.

Figure 7A:
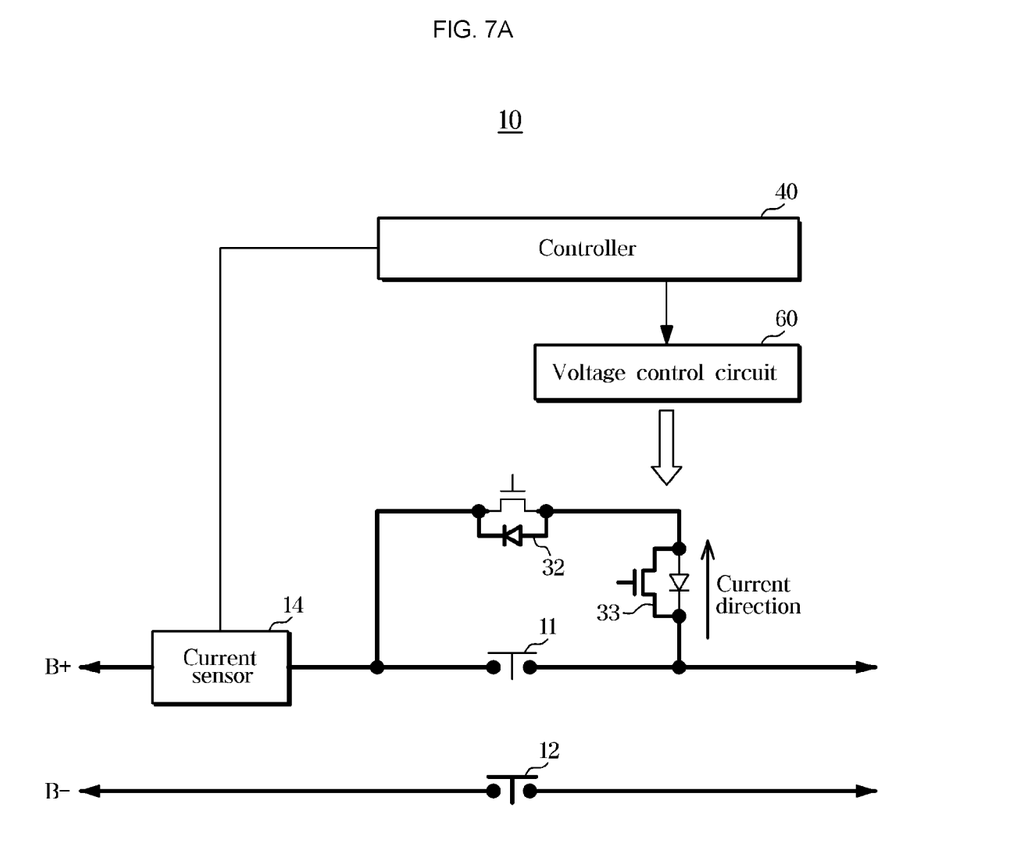
FIGS. 7A and 7B are views for describing the operation of the power relay assembly operating in the charging state of the battery according to an exemplary embodiment.
Figure 7B:
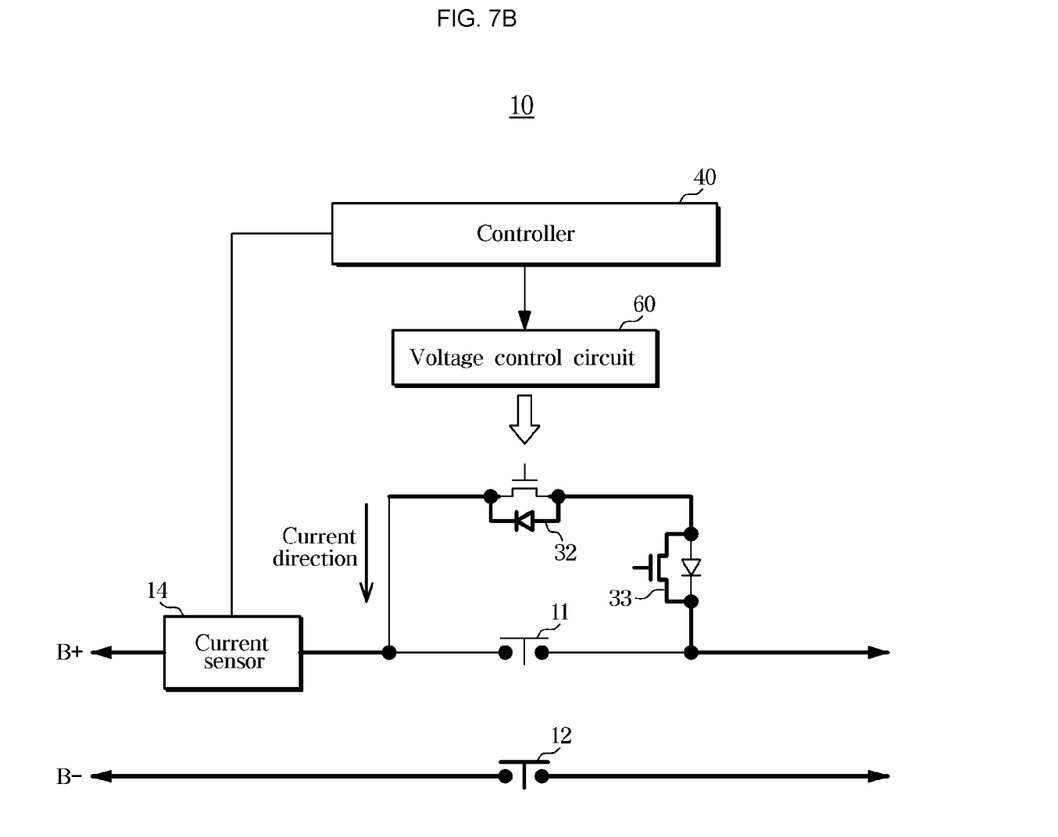

FIGS. 7A and 7B are views for describing the operation of the power relay assembly operating in the charging state of the battery. After the pre-charge, the battery B may be supplied with power. In other words, when charging with the battery B, the controller 40 may be configured to apply a turn-on voltage (for example, about 15V) to the second FET 33 and turn on the second FET 33. As shown in FIG. 7A, current flows toward the battery B through the internal diodes of the second FET 33 and the first FET 32. Both contacts of the first relay 11 have the same potential due to the pre-charge. In other words, even if the first relay 11 is turned off as shown in FIG. 7B, no arc or sparks are generated.

Figure 8:
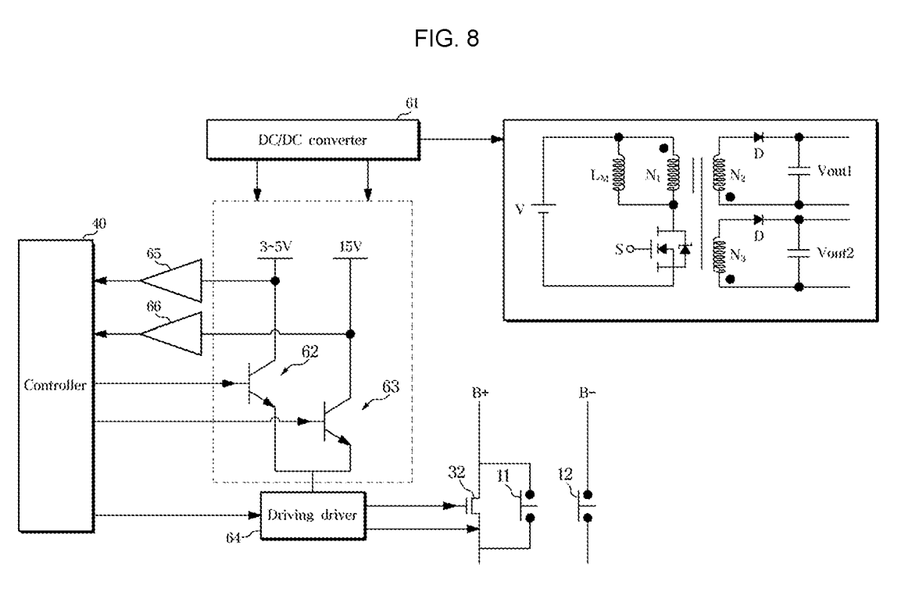
FIG. 8 is a view for describing the operation of the voltage control circuit according to an exemplary embodiment.

FIG. 8 is a view for describing the operation of the voltage control circuit. Referring to FIG. 8, the voltage control circuit 60 included in the disclosed power relay assembly 10 may include a DC/DC converter 61 configured to convert voltage, a driver 64 configured to drive at least two semiconductor elements 62, 63 and the first FET 32, and an OP-AMP 65, 66 configured to detect the turn-on voltage and pre-charge voltage transmitted from the DC/DC converter 61, compare and determine it.

Specifically, the DC/DC converter 61 is sufficient if it is a general DC/DC converter as shown in FIG. 8. The DC/DC converter 61 may be configured to change the voltage capable of being supplied from the battery B by the controller 40 to the magnitude of the turn-on voltage or to the magnitude of the pre-charge voltage. As described above, the magnitude of the turn-on voltage may be 15V or the magnitude of the pre-charge voltage may be set at about 3 to 5V, but is not limited thereto, and may be variously changed.

The magnitude of the voltage changed in the DC/DC converter 61 may be detected through the OP-AMPs 65 and 66, and the controller 40 may be configured to determine whether the magnitude of the voltage is normal based on the detection result. When performing a pre-charge operation according to a control command received from the BMS 50, the controller 40 may be configured to apply a pre-charge voltage to the first FET 32 through the driving driver 64. In addition, when performing the above-described operation in FIGS. 6A to 7B, the controller 40 may be configured to apply the turn-on voltage to the first FET 32 through the driving driver 64. In other words, the controller 40 may be configured to operate the driving driver 64 to perform voltage control between the gate-source or drain-source of the first FET 32 with a pre-charge voltage or a turn-on voltage through at least two semiconductor elements 62 and 63.

Figure 9:
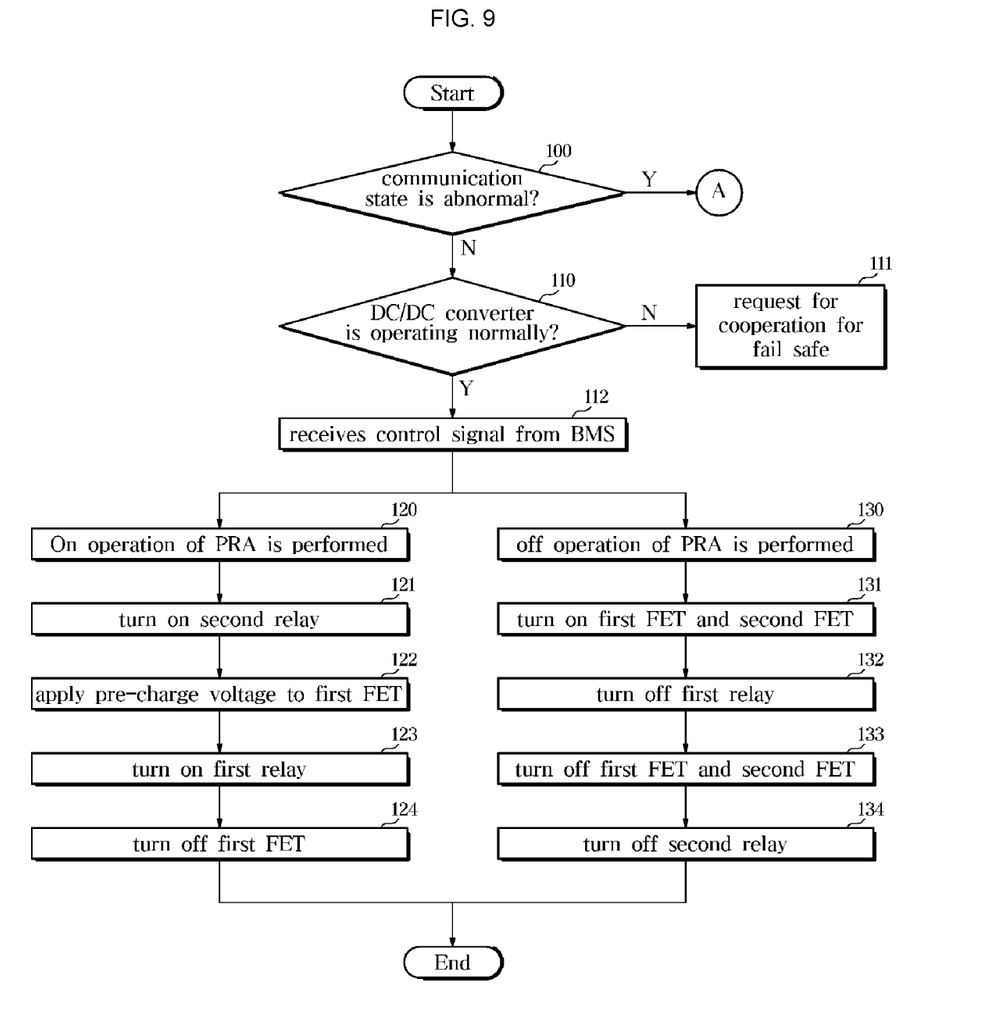
FIGS. 9 and 10 is a flow chart of a control method of a power relay assembly according to an exemplary embodiment.
Figure 10:
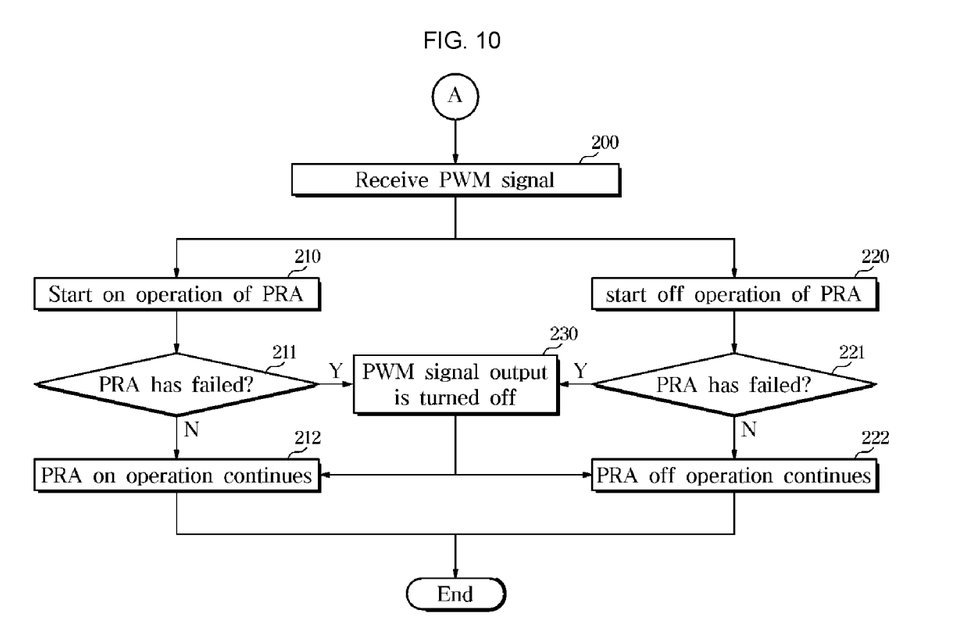

FIGS. 9 and 10 is a flow chart of a control method of a power relay assembly according to an exemplary embodiment. Referring first to FIG. 9, the controller 40 may be configured to determine whether the communication state with the BMS 50 is abnormal (100). In response to determining that the communication state is not normal (No in 100), the control method according to the flowchart of FIG. 10 is executed (A). If the communication state is normal (YES in 100), the controller 40 may be configured to determine whether the DC/DC converter 61 is operating normally (110). In response to determining that the DC/DC converter 61 operates abnormally (NO in 110), the controller 40 may be configured to transmit a request for cooperation for fail safe to the BMS 50 or another ECU in the vehicle 1 (111).

In response to determining that the DC/DC converter 61 operates normally (YES in 110), the controller 40 may be configured to receive a control signal from the BMS 50 (112). On/off operation of the power relay assembly (PRA) 10 of the controller 40 may be performed based on the control signal of the BMS 50 (120, 130). The controller 40 may be configured to turn on the second relay 12 based on the on signal transmitted by the BMS 50 (121). Then, the controller 40 applies a pre-charge voltage to the first FET 32 (122).

As described above, the pre-charge voltage is a voltage having a magnitude lower than the turn-on voltage. The controller 40 may be configured to turn on the first relay 11 (123) and turn off the first FET 32 (124). Through this, the disclosed power relay assembly 10 may suppress the occurrence of arc or spark even when the first FET 32 is turned off.

Meanwhile, the controller 40 may be configured to turn on the first FET 32 and the second FET 33 based on the off signal transmitted by the BMS 50 (131). Specifically, the controller 40 may be configured to turn on the first FET 32 and the second FET 33 by applying the turn-on voltage through the voltage control circuit 60 to the first FET 32 and the second FET 33. Through this, the disclosed power relay assembly 10 may suppress the occurrence of arc or spark even when the first FET 32 is turned off. The controller 40 may be configured to turn off the first relay 11 (132). Thereafter, the controller 40 may be configured to turn off the first FET 32 and the second FET 33 (133), and turn off the second relay 12 (134).

Referring to FIG. 10, the controller 40 may be configured to directly receive the PWM signal from the BMS 50 based on the communication abnormality (200). After measuring the PWM signal received from the BMS 50, the controller 40 may be configured to start controlling the on or off operation of the PRA based on the measured PWM duty or period (210, 220). The controller 40 may be configured to determine whether the power relay assembly (PRA) 10 has failed (e.g., malfunction) while performing on or off operation of the PRA described above in FIG. 9 (211, 212).

If during the on operation of the PRA, the power relay assembly (PRA) 10 may be determined to have failed (YES in 211), the PWM signal output may be turned off (230). In other words, if the power relay assembly (PRA) 10 is determined to have failed, the controller 40 does not perform an additional on operation of the PRA. If the power relay assembly (PRA) 10 has not failed (e.g., operates normally) (No in 211), the controller 40 may be configured to continue to perform on operation of the PRA (212).

On the other hand, if the power relay assembly (PRA, 10) is determined to have to failed (e.g., in response to determining a failure of the PRA) during off operation of the PRA (YES in 212), the PWM signal output may be turned off (230). In other words, if the power relay assembly (PRA) 10 is determined to have failed, the controller 40 does not perform an additional off operation of the PRA. If the power relay assembly (PRA, 10) does not fail (No in 221), the controller 40 may be configured to continue to execute off operation of the PRA (222).

A power relay assembly according to the disclosed aspect, a vehicle including the same and a control method of a power relay assembly may be provided with at least two semiconductor switching elements, thereby reducing weight and size compared to a conventional gas charging relay. A power relay assembly according to another aspect, a vehicle including the same and a control method of a power relay assembly may improve life and durability as compared to the prior art by removing sparks generated in relay on/off.

A power relay assembly according to another aspect, a vehicle including the same and a control method of a power relay assembly may perform a fail safe operation through an electronic control unit capable of communicating with a battery managing system (BMS) that manages a battery.

What is claimed is:

1. A power relay assembly, comprising:
   a first relay connected to a positive end of a battery;
   a second relay connected to a negative end of the battery and connected to the first relay via a direct current (DC) capacitor;
   a first switch connected in series with a second switch; the first relay connected in parallel with the combination of series connected first switch and second switch; and
   a voltage control circuit configured to adjust a voltage of the first switch with a first voltage or adjust a voltage of the first switch with a second voltage lower than the magnitude of the first voltage,
   wherein the voltage control circuit includes a DC/DC converter and at least two semiconductor elements and is configured to control the first switch based on the second voltage to charge the DC capacitor.

2. The power relay assembly according to claim 1, further comprising:
   a transceiver configured to communicate with a battery management system (BMS) that controls the battery; and
   a controller configured to adjust the voltage control circuit based on an on signal or an off signal of the BMS.

3. The power relay assembly according to claim 2, wherein the controller is configured to collect the output voltage of the DC/DC converter, and determine whether the DC/DC converter is normal based on the collected voltage.

4. The power relay assembly according to claim 2, wherein the controller is configured to turn on the second relay based on the on signal of the BMS, operate the power control circuit to apply the second voltage to the first switch and turn off the first switch after turning on the first relay.

5. The power relay assembly according to claim 2, wherein the controller is configured to operate the power control circuit to apply the first voltage to the first switch and the second switch based on the off signal of the BMS, turn off the first switch and the second switch after turning off the first relay and turn off the second relay.

6. The power relay assembly according to claim 2, further comprising:
a current sensor disposed between the battery and the first relay, and
wherein the controller is configured to determine whether normal operation is performed based on the detection value of the current sensor, and transmit the determination result to the BMS through the transceiver.

7. The power relay assembly according to claim 1, wherein the magnitude of the second voltage is determined based on element characteristics of the first switch and the second switch or charging time of the DC capacitor.

8. The power relay assembly according to claim 2, wherein the controller is configured to determine whether the transceiver is normal, receive a Pulse Width Modulation (PWM) signal from the BMS in response to determining a failure of the transceiver and operate the voltage control circuit based on the received PWM signal.

9. The power relay assembly according to claim 8, wherein the controller is configured to turn on or turn off the power relay assembly based on the PWM signal, diagnose a failure of the power relay assembly and turn off the PWM signal based on the diagnosis result.

10. A vehicle, comprising:
a motor;
a battery configured to drive the motor; and
a power relay assembly configured to connect the battery and the motor,
wherein the power relay assembly includes:
a first relay connected to a positive end of a battery;
a second relay connected to a negative end of the battery and connected to the first relay through a direct current (DC) capacitor;
a first switch connected in series with a second switch; the first relay connected in parallel with the combination of series connected first switch and second switch; and
a voltage control circuit configured to adjust a voltage of the first switch with a first voltage or adjust a voltage of the first switch with a second voltage lower than the magnitude of the first voltage;
wherein the voltage control circuit includes a DC/DC converter and at least two semiconductor elements and is configured to control the first switch based on the second voltage to charge the DC capacitor.

11. The vehicle according to claim 10, further comprising:
a battery management system (BMS) configured to control the battery,
wherein the power relay assembly includes:
a transceiver configured to communicate with the BMS; and
a controller configured to operate the voltage control circuit based on an on signal or an off signal of the BMS.

12. The vehicle according to claim 11, wherein the controller is configured to collect the output voltage of the DC/DC converter, and determine whether the DC/DC converter is normal based on the collected voltage.

13. The vehicle according to claim 11, wherein the controller is configured to turn on the second relay based on the on signal of the BMS, operate the power control circuit to apply the second voltage to the first switch and turn off the first switch after turning on the first relay.

14. The vehicle according to claim 11, wherein the controller is configured to operate the power control circuit to apply the first voltage to the first switch and the second switch based on the off signal of the BMS, turn off the first switch and the second switch after turning off the first relay and turn off the second relay.

15. The vehicle according to claim 11, further comprising:
a current sensor disposed between the battery and the first relay, and
wherein the controller is configured to determine whether normal operation is performed based on the detection value of the current sensor, and transmit the determination result to the BMS through the transceiver.

16. The vehicle according to claim 10, wherein the magnitude of the second voltage is determined based on element characteristics of the first switch and the second switch or charging time of the DC capacitor.

17. The vehicle according to claim 11, wherein the controller is configured to determine whether the transceiver is normal, receive a Pulse Width Modulation (PWM) signal from the BMS in response to determining a failure of the transceiver and operate the voltage control circuit based on the received PWM signal.

18. A control method of a power relay assembly comprising a first relay connected to a positive end of a battery, a second relay connected to a negative end of the battery and connected to the first relay through a direct current (DC) capacitor, a first switch connected in series with a second switch; the first relay connected in parallel with the combination of series connected first switch and second switch; and a voltage control circuit configured to adjust a voltage of the first switch with a first voltage of the first switch with a second voltage lower than the magnitude of the first voltage, the control method comprising:
receiving, by a controller, a control signal from a battery management system (BMS) configured to control the battery;
adjusting, by the controller, the voltage of the first switch with a first voltage based on the control signal of the BMS or adjusting the voltage of the first switch with a second voltage lower than the magnitude of the first voltage; and
controlling, by the voltage control circuit, the first switch based on the second voltage to charge the DC capacitor, wherein the voltage control circuit includes a DC/DC converter and at least two semiconductor elements.

* * * * *